United States Patent [19]

Berta et al.

[11] 3,842,284

[45] Oct. 15, 1974

[54] RADIOACTIVE PREIONIZATION METHOD AND APPARATUS FOR PULSED GAS LASERS

[75] Inventors: Michael A. Berta, Altadena, Calif.; Claude R. Jones, Albuquerque, N. Mex.

[73] Assignee: The United States of America as represented by the Secretary of the Air Force, Washington, D.C.

[22] Filed: Dec. 15, 1972

[21] Appl. No.: 315,744

[52] U.S. Cl............................. 250/493, 331/94.5 P
[51] Int. Cl............................................. H01s 3/00
[58] Field of Search................ 250/493; 331/94.5 P; 313/54; 317/4

[56] References Cited
UNITED STATES PATENTS
3,657,600   4/1972   Wiegand................................. 317/4

OTHER PUBLICATIONS

Increase of $CO_2$ Laser Power Under the Influence of a Beam of Fast Protons, Andriaklin et al., Oct. 5, 1968, pp. 214–216.

Primary Examiner—Archie R. Borchelt
Assistant Examiner—Davis L. Willis
Attorney, Agent, or Firm—Harry A. Herbert, Jr.; George Fine

[57] ABSTRACT

Radioactive preionization method and apparatus for pulsed gas lasers wherein emissions from a radioactive isotope located within or around the gas-laser active volume are used to create a constant, uniform preionization in the laser gas and aid the formation of the main electrical discharge pulse.

5 Claims, 1 Drawing Figure

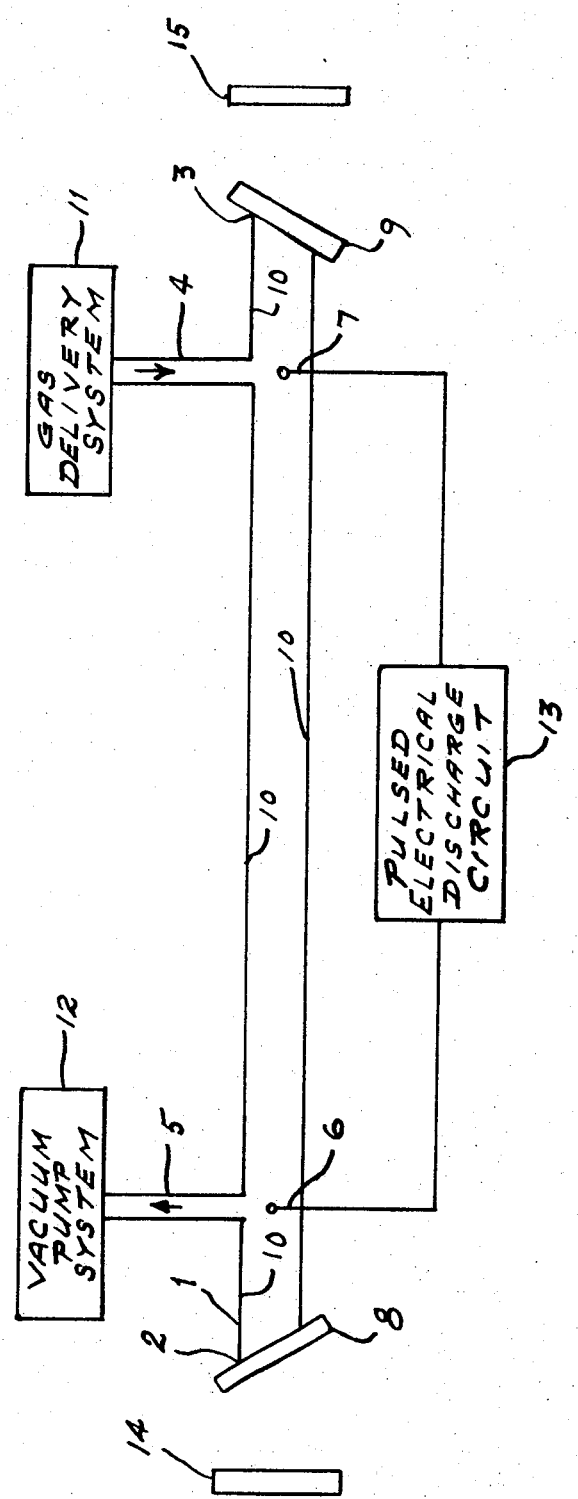

RADIOACTIVE PREIONIZATION METHOD AND APPARATUS FOR PULSED GAS LASERS

BACKGROUND OF THE INVENTION

The mechanics of gas lasers are currently well known. Preionization of the gas-laser active volume in the prior art is also known. For example, past and present methods of preionization include electron beams, photon beams, and predischarging, i.e., a voltage pulse in the gas preceding the primary one. However, there are limitations in the afore-recited methods.

The present invention uses a radioactive source to achieve preionization which aids in achieving a uniform, filament-free electrical discharge, and hence population inversion within the gas-laser active volume. The invention also aids in achieving a workable pulsed electrical discharge in higher pressure gas-laser mixtures. Thus, a greater laser energy of higher optical quality can be obtained from the same laser volume than without the radioactive emission preionization.

The present invention may be utilized in high-energy laser programs in order to achieve laser pulses from gas lasers of greater energy and higher optical quality than have been achieved in the prior art. The radioactive emission preionization method may be employed with pulsed chemical lasers, e.g., hydrogen fluoride, other molecular lasers, e.g., carbon dioxide or carbon monoxide, or atomic lasers, e.g., the metal-vapor lasers such as copper.

SUMMARY OF THE INVENTION

A radioactive preionization method and apparatus are provided for pulsed gas lasers. Emissions from a radioactive isotope located within or around the gas-laser active volume are used to create a constant, uniform preionization in the laser gas and aids the formation of the main electrical discharge pulse. The pulsed electrical discharge will hence be caused to be more spatially uniform in intensity, less prone to form discharge filaments and arcs, more repeatable from pulse to pulse, and capable of operating more satisfactorily at higher gas pressures than one not subjected to radioactive emission preionization. The laser pulse formed by the population inversion, which is in turn produced by the main electrical discharge pulse, will be of higher optical quality than one formed by an electrical discharge pulse without radioactive emission preionization. The population inversion may be produced in an assemblage of either atoms or molecules, or both, and may be produced (a) directly by electron-impact excitation and/or ionization of the gas particles, or (b) indirectly by atomic and/or molecular energy-transfer processes subsequent to initial excitation, or (c) indirectly by chemical reactions subsequent to initial molecular dissociation. The radioactive source may be coated on the walls of the laser vessel or may be placed in or on the discharge electrodes. In addition, a gas-phase radioactive emitter may be premixed within the laser gas and may or may not be one of the laser-active gas particles. The radioactive emission preionization method may be employed in addition to other techniques intended to enhance pulsed gas-laser electrical discharges, e.g. transverse pin-type electrode configuration or electron-beam preionization.

DESCRIPTION OF THE DRAWINGS

The single FIGURE shows a preferred embodiment of the invention.

DETAILED DESCRIPTION OF THE PREFERRED EMBODIMENT

Now referring to the single FIGURE, there is shown main pyrex tube 1 of about 6 millimeters inside diameter and one millimeter wall thickness which has been cut to about a 20 centimeters length, each of ends 2 and 3 is cut off at an angle of 35 (+1)° to the tube axis. Two smaller-diameter pyrex side arms, for gas inlet and outlet, respectively, are fused to main pyrex tube 1. Side arms 4 and 5 are separated by about 16 centimeters and each perpendicular to main pyrex tube 1. High-voltage pulse electrodes 6 and 7 of tungsten wire of about one-half millimeter diameter are protruded through the main pyrex tube wall at a separation of about 16 millimeters and at an angle of 90° to the main pyrex tube axis. One-inch diameter sodium chloride optical windows 8 and 9 are sealed over ends 2 and 3, respectively, of main pyrex tube 1 and are oriented at about 35° to the main pyrex tube axis. The entire structure is vacuum tight except for the ends of inlet and outlet arms 4 and 5, respectively. The assembly described above is hereinafter referred to as the laser cell.

An appropriate amount (one millicurie or that determined to be sufficient for a particular tube) of radioactive, e.g. polonium-210, salt is suspended in an available conventional vacuum compatible adhesive and coated on the tube walls excluding windows 2 and 3. The suspension is allowed to dry and adhere in a uniform manner to the tube walls to provide radioactive inner coating 10. All safety procedures applicable to this procedure must be, of course, closely followed.

Inlet arm 4 is attached to conventional gas-delivery system 11 and outlet arm 5 to conventional vacuum-pump system 12. With vacuum-pump system 12 operating, gas-delivery system 11 is set to deliver the conventional appropriate mixture of fluorine compound (e.g. sulfur hexafluoride), hydrogen compound (e.g. hydrogen), and diluent (e.g. helium). The gas-mixture pressure in the cell and pumping speed is adjusted for optimum performance. Pulsed electrical discharge circuit 13 applies a voltage pulse of the appropriate magnitude (e.g. 20 kilovolts) and time duration (e.g. 10 microseconds) across electrodes 6 and 7. Conventional appropriate laser mirrors 14 and 15 are located and aligned on each end of the laser cell. A laser pulse detector may be used to sense the laser pulses emitted by the pulsed laser.

The laser described herein is a hydrogen-fluoride laser; however, other gas mixtures (e.g. carbon-dioxide, nitrogen and helium for a carbon dioxide laser) could be employed to create laser action at another wavelength.

It is noted that the electrode configuration could be changed for higher-energy laser pulses to the transverse configuration, i.e., the discharge occurs perpendicular to the cell axis. The cell can also be enlarged for higher energy pulses.

It is emphasized that the radioactive source may be coated on the walls of the laser vessel or may be placed in or on the discharge electrodes. In addition, a gas-phase radioactive emitter may be premixed within the laser gas and may or may not be one of the laser-active gas particles.

It is claimed:

1. The method of radioactive preionization for a gas laser having a gas-laser active volume comprising locating a radioactive source exclusively in the region of said gas-laser active volume with continuous and permanent emissions therefrom creating a constant, uniform preionization in the laser gas, and pulsing an electrical discharge in said gas laser to produce a population inversion resulting in a laser pulse in response thereto.

2. A radioactive preionization apparatus for a gas laser having a gas laser-active volume comprising radioactive means exclusively positioned in the region of said gas-laser active volume with continuous and permanent emissions therefrom creating a constant, uniform preionization in the laser gas, and means to pulse said gas-laser to produce a population inversion resulting in a laser pulse in response thereto.

3. A radioactive preionization apparatus as described in claim 2 wherein said radioactive means is comprised of a coating of radioactive salt in the interior of said gas laser.

4. A radioactive preionization apparatus as described in claim 3 wherein said radioactive salt consists of polonium-210.

5. A radioactive preionization apparatus as described in claim 2 wherein said radioactive means consists of an isotope.

* * * * *